United States Patent

Taylor

[15] 3,678,090

[45] July 18, 1972

[54] AMMOXIDATION OF SATURATED HYDROCARBONS

[72] Inventor: Keith M. Taylor, Ballwin, Mo.

[73] Assignee: Monsanto Company, St. Louis, Mo.

[22] Filed: Dec. 17, 1970

[21] Appl. No.: 99,298

Related U.S. Application Data

[63] Continuation-in-part of Ser. No. 801,764, Feb. 24, 1969, abandoned, and a continuation-in-part of Ser. No. 787,571, Dec. 27, 1968, abandoned.

[52] U.S. Cl. ............................................................. 260/465.3
[51] Int. Cl. ................................. C07c 121/02, C07c 121/32
[58] Field of Search ................................................. 260/465.3

[56] References Cited

UNITED STATES PATENTS

| | | | |
|---|---|---|---|
| 3,118,928 | 1/1964 | Garrison, Jr. | 260/465.3 |
| 3,142,697 | 7/1964 | Jennings et al. | 260/465.3 |
| 3,161,670 | 12/1964 | Adams et al. | 260/465.3 |
| 3,433,823 | 3/1969 | McMahon | 260/465.3 |

*Primary Examiner*—Joseph P. Brust
*Attorney*—Paul L. Passley, Richard W. Sternberg and Neal F. Willis

[57] ABSTRACT

Method for the production of acrylonitrile or methacrylonitrile from propane or isobutane employing a catalyst containing antimony and tin or indium.

4 Claims, No Drawings

AMMOXIDATION OF SATURATED HYDROCARBONS

This application is a continuation-in-part of copending applications Ser. Nos. 801,764 filed Feb. 24, 1969 now abandoned and 787,571 filed Dec. 27, 1968 now abandoned.

BACKGROUND OF THE INVENTION

This invention relates to the ammoxidation of saturated hydrocarbons to form unsaturated nitriles, particularly alpha, beta-ethylenically unsaturated mono-nitriles.

The value of alpha, beta-unsaturated nitriles is generally well recognized with acrylonitrile being among the most valuable monomers available to the polymer industry for producing useful polymeric products. Acrylonitrile is useful in the preparation of synthetic fibers, synthetic rubbers and other useful plastic products.

Many processes, catalytic and non-catalytic, are known and practiced for the manufacture of alpha, beta-unsaturated nitriles. A generally practiced catalytic ammoxidation process comprises reacting an olefin with ammonia and oxygen in the vapor phase in the presence of a catalyst. For the production of acrylonitrile, propylene is the generally used olefin reactant.

Propane is a source of carbon which is lower in cost than propylene or any other material useful as a starting material in the manufacture of acrylonitrile. Therefore, it is readily recognized that a feasible process for producing acrylonitrile directly from propane would be highly desirable.

Although some art has developed on the ammoxidation of propane to form acrylonitrile, a commercially feasible process has not heretofore been reported because the ultimate yield of acrylonitrile obtained from propane is relatively low. For example, U.S. Pat. No. 3,365,482 discloses the use of molybdenum oxide or tungsten oxide as catalysts for the conversion of propane to acrylonitrile. However, it is observed from this reference that the ultimate yield of acrylonitrile, based on propane converted, is low. As discussed in this patent and clearly recognized in the art, many catalysts are known which with comparative ease effect the ammoxidation of olefins to form alpha, beta-unsaturated nitriles; but that, unfortunately, saturated hydrocarbons do not have a reactivity comparable to unsaturated hydrocarbons to form alpha, beta-unsaturated nitriles.

SUMMARY

This invention is directed to a vapor phase process wherein at least one saturated hydrocarbon, ammonia and oxygen are contacted in the presence of a catalyst containing antimony and a second element selected from the group consisting of indium and tin under reaction conditions which produce unsaturated nitriles, particularly, at least in part, alpha, betaethylenically unsaturated mono-nitriles. Particularly, this invention is useful in converting propane to acrylonitrile and isobutane to methacrylonitrile.

Accordingly, typical objects of this invention are to provide: (1) an improved vapor phase process for the production of unsaturated nitriles, (2) a vapor phase ammoxidation process for converting saturated hydrocarbons directly to unsaturated nitriles, (3) vapor phase ammoxidation processes for the production of acrylonitrile directly from propane and methacrylonitrile directly from isobutane and, (4) a catalyst useful in the ammoxidation of saturated hydrocarbons.

Other objects, aspects and advantages of this invention will become apparent to those skilled in the art upon further study of this disclosure and the appended claims.

In accordance with this invention, in one aspect, unsaturated nitriles are prepared from saturated hydrocarbons in a one step vapor phase process comprising contacting at least one saturated hydrocarbon, ammonia and oxygen in the presence of a catalyst containing, as the essential catalytic ingredients, antimony and a second element selected from the group consisting of indium and tin under conditions suitable for converting the selected saturated hydrocarbon to the desired unsaturated nitrile.

Any saturated hydrocarbon capable of forming unsaturated nitriles may be used in the practice of the invention. The saturated hydrocarbons may contain three to 12 carbon atoms per molecule and may be straight chained or branched.

Basically, the applicable saturated hydrocarbons have up to 12 carbon atoms per molecule and may be represented by the formula:

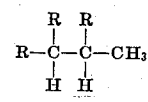

wherein R is hydrogen or a saturated monovalent organic hydrocarbon radical. Examples of useful saturated hydrocarbons are propane, butane, isobutane, pentane, isopentane, hexane, isohexane, 3-methyl pentane, dimethylpentane, 2,3-dimethyl butane, heptane, isoheptane, octane, isononane, dodecane, and the like.

One or more saturated hydrocarbons may be employed in the process at any one time. The saturated hydrocarbons employed should be substantially free of unsaturated hydrocarbons for best conversion and optimum yield of the desired unsaturated nitrile. The present invention is, therefore, not to be confused with the developed art directed to olefin ammoxidation processes which unanimously teach that saturated hydrocarbons in the olefin feed are inert to the reaction and apparently serve as a diluent.

While ammonia is most generally employed, other materials may be employed. For example, ammonia may be generated in use from decomposable ammonium compounds such as ammonium carbonate, or from various amines, such as methyl amine, ethyl amine and aniline. Any source of oxygen, pure or in admixture with inerts, may be employed in the process of this invention. Air is a satisfactory source of oxygen for use in this invention. The molar ratio of the saturated hydrocarbon:ammonia:oxygen employed in the process of this invention, will generally be in the range of 1:0.5:0.5 to 1:6:8 and preferably in the range of 1:1:1.5 to 1:3:4.

The catalyst used in the process of this invention may comprise (i) a mixture of the oxides of antimony and tin or indium and/or (ii) a compound or complex of oxygen, antimony and tin or indium, such as tin antimonate or indium antimonate.

The antimony:second element (indium or tin) atomic ratio of the catalyst effective in the conversion of saturated hydrocarbons to unsaturated nitriles can generally range from about 1:10 to about 10:1, although ratios of antimony and indium or tin outside of this range can be used. The catalyst can be employed with or without a support. When used with a support, preferably the support comprises 10 to 90 percent by weight of the catalyst. Any known support materials can be used, such as, for example, silica, alumina, zirconia, alundum silicon carbide, alumina-silica, pumice and the inorganic phosphates, silicates, aluminates, borates and carbonates, stable under the reaction conditions encountered in the process in which the catalyst is used.

The antimony and indium or tin components can be formed separately and then blended or formed separately or together in situ. As starting materials for the antimony component, for example, there can be used any antimony oxide, such as antimony tri-oxide, antimony tetroxide, and antimony pentoxide or mixtures thereof; or any antimony phosphate; or a hydrous antimony oxide, meta-antimonic acid, orthoantimonic acid, or pyro-antimonic acid; or a hydrolyzable or decomposable antimony salt, such as an antimony halide, for example, antimony trichloride, tri-fluoride, or tri-bromide; antimony pentachloride or antimony pentafluoride, which is hydrolyzable in water to form the hydrous oxide. Antimony metal can be employed with the hydrous oxide being formed by oxidizing the metal with an oxidizing acid such as nitric acid.

The tin component can be provided in the form of tin oxide, tin phosphate or by precipitation in situ from a soluble tin salt such as stannous chloride, or stannic chloride. Tin metal can be used as a starting material, and if antimony metal is also employed, the antimony and tin can be converted to the oxide by oxidation with hot nitric acid.

The indium component can be provided in the form of an oxide, phosphate or by precipitation in situ from a soluble indium salt such as indium chloride. Indium metal can be used as a starting material and converted to the oxide by oxidation with hot nitric acid.

The activity of the catalyst system is enhanced by heating at an elevated temperature. Preferably the catalyst mixture is dried and heated at a temperature of from about 250° to about 650° C. for from 2 to 24 hours and then calcined at a temperature from about 300° to about 900° C. for from 2 to 8 hours.

As previously stated, the process of this invention is carried out as a vapor phase reaction. Accordingly, any apparatus of the type suitable for carrying out oxidation reactions in the vapor phase may be employed for the practice of the process. The process may be operated continuously or intermittently, and may employ a fixed bed with a large particulate or pelleted catalyst, or a so-called "fluidized" bed of catalyst with finely divided catalyst. The latter type is presently preferred for use with the process of this invention as it permits closer control of the temperature of the reaction.

The process of this invention is carried out at a temperature in the range of about 300° C. and up to about 650° C. Preferably, the reaction is conducted at a temperature in the range of about 350° to about 550° C. When ammoxidizing propane to yield acrylonitrile the preferred operating temperature is in the range of 450° to 600° C. and when ammoxidizing isobutane to methacrylonitrile such temperature is in the range of 350° to 500° C.

Pressures other than atmospheric may be employed in the process of this invention, however, it will generally be preferred to conduct the reaction at or near atmospheric pressure, since the reaction proceeds well at such pressure and the use of expensive high pressure equipment is avoided.

The contact time between the reactants and catalyst employed in the process of this invention may be selected from a broad operable range which may vary from about 0.1 to about 50 seconds. The contact time may be defined as the length of time in seconds which the unit volume of reactant gases measured under reaction conditions is in contact with the volume of catalyst employed. The optimum contact time will, of course, vary, depending upon the hydrocarbon being reacted, the catalyst and the reaction temperature. In the case of converting propane to acrylonitrile, the contact time will preferably be within the range of 0.5 to 15 seconds.

The reactor employed may be brought to the desired reactor temperature before or after the introduction of the vapors to be reacted. Preferably, the process is conducted in a manner with the unreacted feed materials being recirculated. Also, the activity of the catalyst may be regenerated by contacting the catalyst with air at elevated temperatures.

The products of the reaction may be recovered from the effluent gas by any appropriate method and means known to the art and further elucidation here will be unnecessary duplication of the art.

DESCRIPTION OF PREFERRED EMBODIMENTS

The following Examples are given as illustrative of the invention and, as such, specifics presented therein are not intended to be unduly considered limitations upon the scope of this invention.

In the following Examples, the reactor used is a concentric tube system fabricated from 96 percent quartz tubing. The inner tube is one-half inch by 12 inches and the outer tube is 1 inch diameter. The reactor unit is supported in a vertical 1 inch tube furnace. Heat control of the reactor is accomplished by fluidizing Fisher "sea" sand in the shell side of the reactor unit. The reaction temperatures given in the Examples are measured by a thermocouple in the center of the reactor. Prior to entering the reactor, the reactant gases are mixed in standard Swagelock stainless steel "T's" and introduced into the bottom of the reactor through a coarse quartz fritted tube. The effluent gases from the reactor are chromatographically analyzed.

EXAMPLE I

This Example illustrates the preparation of a catalyst consisting essentially of antimony and tin in an atomic ratio of Sb:Sn of 1:3.

A solution is prepared by dissolving 15.3 grams of $SnCl_2 \cdot H_2O$ in 15 grams of 1 percent HCl. This solution and 6.8 grams of $SbCl_5$ are added simultaneously to 150 grams of water. This mixture is heated and maintained at 95° C. for 5 hours. The mixture is cooled to room temperature, diluted with 50 grams of water and the pH of the mixture is adjusted to 5 with ammonium hydroxide. The mixture is filtered and washed with water. The precipitate is dried in a vacuum oven at 110° C. for 6 hours. The dried catalyst is then calcined under air at 380° C. for 3½ hours and then dried under air at 540° C. for 18 hours.

EXAMPLE II

This Example illustrates the preparation of a silica supported catalyst containing antimony and tin in an atomic ratio of Sb:Sn of 5:1.

A solution is prepared by dissolving 4.6 grams of $SnCl_2 \cdot H_2O$ in 50 ml. of water. This solution is thoroughly mixed with 50 cc. of 30 percent silica sol. To this mixture is added 30 grams of $SbCl_5$ dropwise while the mixture is being stirred. Finally, 70ml. of $NH_4OH$ is stirred into the mixture. The mixture is evaporated to near dryness and then dried in a vacuum oven at 110° C. for about 16 hours. The dried catalyst is then calcined under air at 800° C. for 4 hours.

EXAMPLE III

This Example illustrates the utility of the catalysts as prepared in Examples I and II for converting propane directly to acrylonitrile.

The feed to the reactor consists of propane, ammonia and air. The volume ratio of propane:ammonia is 1:1.2 and propane:air is 1:12. The variables of reaction temperature, contact time and quantities of catalyst are shown in the following table which also gives the results of the reaction.

TABLE

Catalyst: 3Sn:1Sb, 6.6 grams

| Contact Time(Sec.) | Reactor Temp.(°C.) | Propane[1] Conversion % | Acrylonitrile Single Pass[2] Yield % | Ultimate[3] Yield % |
|---|---|---|---|---|
| 1 | 500 | 10.7 | 3.6 | 33.7 |
| 5 |  | 38.1 | 4.7 | 12.2 |
| .3 | 550 | 10.6 | 4.1 | 38.6 |
| 1 |  | 26.9 | 5.5 | 20.4 |
| 5 |  | 41.8 | 4.3 | 10.4 |
| Catalyst: 5Sb:1Sn, 2.9 grams | | | | |
| 5 | 500 | 6.3 | 4.4 | 69.9 |
| 10 |  | 13.9 | 7.3 | 52.6 |
| 5 | 550 | 47.2 | 9.8 | 20.9 |

EXAMPLE IV

Example II is repeated except that isobutane is used as the saturated hydrocarbon instead of propane and temperatures of 375° C., 425° C., 475° C. and 525° C. are employed. Contact times are 4, 8 and 16 seconds. Methacrylonitrile is obtained.

EXAMPLE V

This Example illustrates the preparation of a catalyst comprising antimony and indium in an atomic ratio of Sb:In of 4:1.

A first solution is prepared by dissolving 6 grams of indium metal in 50 cc. of nitric acid. This solution is added with stirring to 150 cc. of 30 percent silica sol. A second solution is prepared by mixing 25 grams of antimony with 100 cc. of nitric acid and heating the solution until all evolution of nitrogen oxides has stopped. This second solution is added with stirring to the indium-silica sol mixture. This mixture is evaporated to near dryness and then dried in a vacuum oven at 110° C. for 16 hours. The dried catalyst is then calcined under air at 700° C. for 6 hours.

EXAMPLE VI

This Example illustrates the utility of the catalyst as prepared in Example V for converting propane directly to acrylonitrile.

The feed to the reactor consists of propane, ammonia and air. The volume ratio of propane:ammonia is 1:1.2 and propane:air is 1:12. The quantity of catalyst in the reactor is 4.6 grams. The variables of reaction temperature and contact times are shown in the following table which also gives the results of the reaction.

TABLE

| Contact Time(sec.) | Reactor Temp.(°C.) | Propane[1] Conversion % | Acrylonitrile Single Pass[2] Yield % | Ultimate[3] Yield % |
|---|---|---|---|---|
| 1 | 500 | 6.4 | 1.2 | 19.4 |
| 5 |  | 23.6 | 3.0 | 12.6 |
| .3 | 550 | 5.0 | 1.6 | 31.3 |
| 1* |  | 23.5 | 2.7 | 11.5 |

[1]Propane Conversion % = (Mols Propane in Feed—Mols Propane in Effluent)/(Mols Propane in Feed) × 100
[2]Acrylonitrile Single Pass Yield % = (Mols Acrylonitrile in Effluent/Mols Propane in Feed) × 100
[3]Acrylonitrile Ultimate Yield % = (Acrylonitrile Single Pass Yield %)/Propane Conversion % × 100
*Ethylene was produced, i.e. 11.9%—single pass yield and 50.5%—ultimate yield.

EXAMPLE VII

Example VI is repeated except that isobutane is used as the saturated hydrocarbon instead of propane and temperatures of 375° C., 425° C., 475° C. and 525° C. are employed. Contact times are 4, 8 and 16 seconds. Methacrylonitrile is obtained.

The antimony/indium or tin catalyst useful in this invention may be prepared by intimately mixing indium oxide or stannic oxide or the hydrated oxide obtained by the action of aqueous nitric acid on indium or tin metal with antimony pentoxide, antimony tetroxide or the hydrated oxide formed by the action of aqueous nitric acid on antimony metal and heat treating the resulting mixture. The catalyst may be prepared by hydrolyzing with water cationic salts of the metals, such as the chlorides and recovering and heating the resulting precipitate. In order to obtain complete hydrolysis, a volatile base such as ammonia or ammonium hydroxide may be added. The suitable antimony-tin catalyst is described in U.S. Pat. No. 3,152,170, which disclosure is hereby incorporated herein by reference.

It will be obvious to persons skilled in the art that various modifications may be made in the improved catalyst and process as described in this application. Accordingly, it is intended that all such modifications which reasonably fall within the scope of the appended claims are included herein.

I claim:

1. A process for the preparation of acrylonitrile or methacrylonitrile which comprises reacting in the vapor phase at a temperature of from about 300° C. to about 650° C. a hydrocarbon consisting essentially of propane or isobutane, ammonia and oxygen in the presence of a catalyst consisting essentially of a mixture of the oxides of antimony and tin or indium or a complex consisting of oxygen, antimony and tin or indium, the atomic ratio of antimony: tin or indium being from 1:10 to 10:1; the molar ratio of hydrocarbon to ammonia to oxygen being from about 1:0.5:0.5 to about 1:6:8.

2. The process of claim 1 wherein said catalyst is supported on silica.

3. The process of claim 1 where acrylonitrile is produced, said hydrocarbon is propane and said temperature is from about 450° C. to about 600° C.

4. The process of claim 1 wherein methacrylonitrile is produced, said hydrocarbon is isobutane and said temperature is from about 350° C. to about 500° C.

* * * * *